US010614600B2

(12) United States Patent
Mund et al.

(10) Patent No.: US 10,614,600 B2
(45) Date of Patent: Apr. 7, 2020

(54) GRAPH BASED TOPOLOGICAL MAP MATCHING

(75) Inventors: Heiko Mund, Hildesheim (DE); Hannes Scharmann, Hildesheim (DE)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 504 days.

(21) Appl. No.: 13/977,793

(22) PCT Filed: Dec. 31, 2010

(86) PCT No.: PCT/EP2010/070973
§ 371 (c)(1),
(2), (4) Date: Sep. 23, 2013

(87) PCT Pub. No.: WO2012/089285
PCT Pub. Date: Jul. 5, 2012

(65) Prior Publication Data
US 2014/0132608 A1    May 15, 2014

(51) Int. Cl.
*G06T 11/20* (2006.01)
*G01C 21/30* (2006.01)

(52) U.S. Cl.
CPC ............ *G06T 11/206* (2013.01); *G01C 21/30* (2013.01)

(58) Field of Classification Search
CPC ......... G01C 21/30; G06T 11/206; G06T 3/40; G06F 3/04845
USPC ....................................................... 345/440
See application file for complete search history.

(56) References Cited

U.S. PATENT DOCUMENTS

| | | | |
|---|---|---|---|
| 2006/0155464 A1* | 7/2006 | Smartt | G01C 21/32 701/450 |
| 2007/0104389 A1* | 5/2007 | Wells | 382/274 |
| 2008/0133291 A1 | 6/2008 | Nasser | |
| 2009/0177382 A1 | 7/2009 | Alles et al. | |
| 2012/0095682 A1* | 4/2012 | Wilson | 701/532 |

(Continued)

FOREIGN PATENT DOCUMENTS

WO        2010000706 A1     1/2010

OTHER PUBLICATIONS

International Search Report dated Aug. 16, 2011 for International Application No. PCT/EP2010/070973.

*Primary Examiner* — Ke Xiao
*Assistant Examiner* — Kim Thanh T Tran (57) ABSTRACT

An improved method for matching traces derived from probe data to one or more line segments in a digital vector map. Points in a probe trace are provisionally matched one-by-one to line segments in the digital vector map to identify all possible matching candidates. A graph of the matching candidates is created having one or more paths. The graph has a plurality of sequential levels corresponding to the points in the probe trace. Each matching candidate is assigned to a level of the graph corresponding with trace point to which it relates. Edges are established between matching candidates in adjacent levels provided they are topologically related to one another. The graph is simplified and scored. The best paths deliver the matching results. The invention allows use of graph theoretic methods to find the best path through the graph, which in turn represents an efficient map matching algorithm. The concepts of this invention may be used in conjunction with longitudinal distance as matching criterion.

20 Claims, 10 Drawing Sheets

(56) References Cited

U.S. PATENT DOCUMENTS

2012/0116678 A1\* 5/2012 Witmer .................. G01C 21/32
            702/5
2013/0030692 A1\* 1/2013 Hagan .......................... 701/410

\* cited by examiner

| Trace Point | Line | Measure | Offset | Maximal Offset Value |
|---|---|---|---|---|
| P1 | L1 | $m_1^1$ | $d_1^1 \leq d$ | $d$ (start value, in the next step it changed to $D$) |
| P2 | L1 | $m_2^1$ | $d_2^1 \leq D$ | $D$ |
|  | L4 | $m_2^4$ | $d_2^4 \leq d$ | $d$ (start value, for Line L4, in the Next Step it changed to $D$) |
| P3 | L1 | $m_3^1$ | $d_3^1 \leq D$ | $D$ |
|  | L4 | $m_3^4$ | $d_3^4 \leq D$ | $D$ |
| P4 | L1 | $m_4^1$ | $d_4^4 \leq D$ | $D$ |
|  | L4 | $m_4^4$ | $d_4^4 \leq d$ | $D/d$ |
|  | L2 | $m_4^2$ | $d_4^2 \leq d$ | $d$ (start value, for Line L2, in the Next Step it changed to $D$) |
|  | L3 | $m_4^3$ | $d_4^3 \leq d$ | $d$ (start value, for Line L3, in the Next Step it changed to $D$) |
| P5 | L1 | $m_5^1$ | $d_5^1 \leq d$ | $D/d$ |
|  | L2 | $m_5^2$ | $d_5^2 \leq d$ | $D/d$ |
|  | L3 | $m_5^3$ | $d_5^3 \leq D$ | $D$ |
| P6 | L3 | $m_6^3$ | $d_6^3 \leq D$ | $D$ |
| P7 | L3 | $m_7^3$ | $d_7^3 \leq D$ | $D$ |
| P8 | L3 | $m_8^3$ | $d_8^3 \leq D$ | $D$ |

GRAPH BASED TOPOLOGICAL MAP MATCHING

CROSS REFERENCE TO RELATED APPLICATIONS

This application is the National Stage of International Application No. PCT/EP2010/070973 filed Dec. 31, 2010 and designating the United States. The entire content of this application is incorporated herein by reference.

BACKGROUND OF THE INVENTION

Field of the Invention

This invention relates generally to a method for analyzing probe data, and more particularly to a method of matching probe traces to a digital vector map.

Related Art

Figure 1:
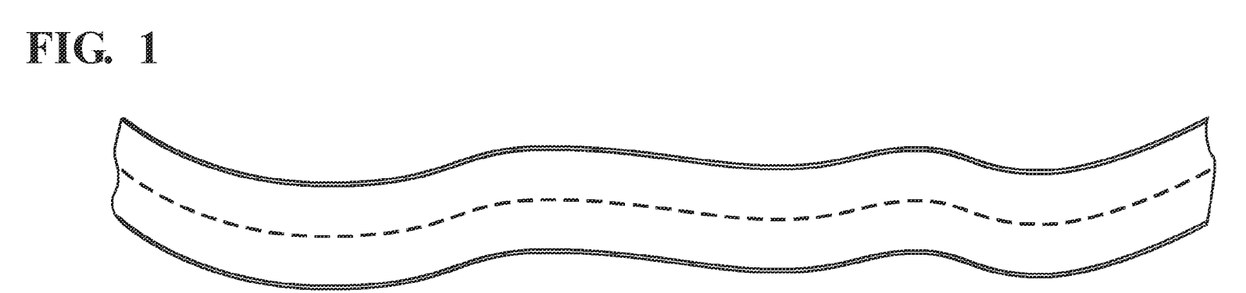
FIG. 1 is a birds-eye view of an exemplary road in reality.
Figure 2:
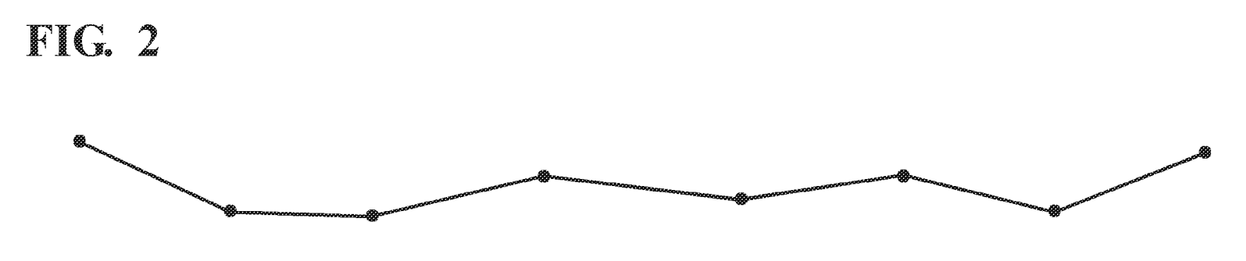
FIG. 2 is a line segment from a digital map corresponding to a road in reality.

Roads in reality, like that illustrated in FIG. 1, are used to sustain traffic flow over land. Traffic flow may be either all in one direction, or bi-directional as shown in FIG. 1. Electronic maps (also known as digital maps or digital vector maps) are increasingly used by travelers to assist with various navigation functions, such as to determine the overall position and orientation of the traveler and/or vehicle, find destinations and addresses, calculate optimal routes, and provide real-time driving guidance. A digital map is configured to store a plurality of line segments spatially associated within a coordinate system. Each line segment, like that shown in FIG. 2, is composed of a sequence of edges connected together by shape points.

Figure 3:
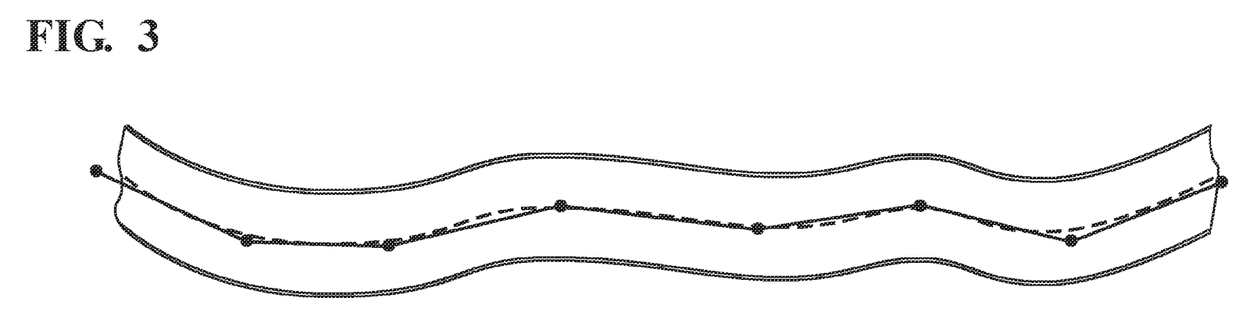
FIG. 3 shows the line segment of FIG. 2 superimposed over the road of FIG. 1.
Figure 9:
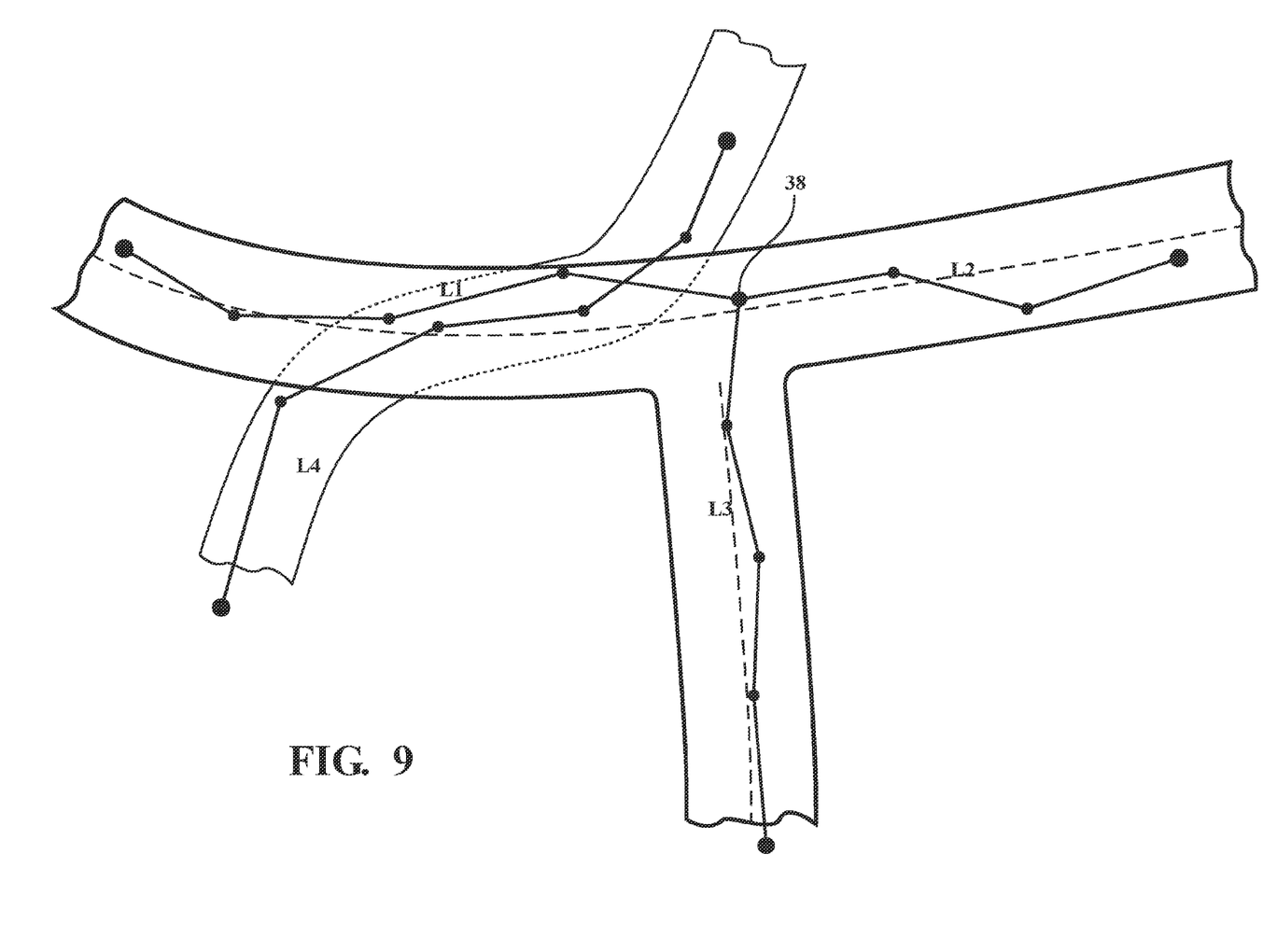
FIG. 9 is an exemplary illustration of a road system together with representative line segments from a digital map in which one roadway (L1) is topologically unrelated to an adjacent roadway (L4)

When associated with a road in reality, the line segment typically represents the road centerline as shown in FIG. 3. Within the digital map, the plurality of line segments are respectively topologically related or unrelated to one another. In general, related line segments adjoin one another so that traffic along the roads in reality is free to pass directly from one line segment to the next. Topologically unrelated line segments, on the other hand, are not directly connected and thus it is generally not possible for traffic along the roads in reality to pass directly between unrelated line segments. For example, FIG. 9 depicts overlapping line segments L1 and L4 that are topologically unrelated. Line segments L1, L2 and L3 on the other hand are topologically related to one another.

Digital maps are expensive to produce and update, since collecting and processing road information is very costly. Once a digital map has been created, it is costly to keep map information up to date, due to road geometry changes over time. Vehicle probe data may be used to hold road networks up-to-date. Vehicle probe data, also known as a probe trace, is a sequence of position data together with a timestamp and maybe additional data like speed, acceleration, heading, accuracy, etc. The individual position data are called trace points. A probe trace usually represents the movement of a car, bicycle, pedestrian, etc. The trace points are usually represented in a two or three dimensional coordinate system. The timestamp can be represented in an implicit way or can be omitted from the probe data. Often equidistant time intervals are used, in which case it is only necessary to store the time of the first trace point. If the time is not of interest the time information is maybe omitted. Thus, in the simplest case, a probe trace contains only the position data. With different approaches it is possible to generate a new network from probe data. New probe data which are available can be used in this manner to easily refine and extend a road network in a digital map system, provided the traces from such data can be suitably matched to a map.

Map matching algorithms are a key technology for digital map producers. They are necessary for nearly all applications of probe data, including attribute mining (e.g., speed profiles), network generation, network refinement and the detection of changes. Moreover map matching algorithms are needed in every navigation device in order to detect its current position on the navigation map. There exist already different map matching methods. One can distinguish online and off-line map matching algorithms. For on-line algorithms, only the current and the previous GPS points are available. On the contrary, off-line algorithms can use additionally some or even all future GPS points.

Furthermore one can distinguish between complete and incomplete map matching algorithms. A complete map matching allocates each trace point to any line segment. With this approach it is possible that a trace point is far away from the matched line segment. Therefore one has to assure that the digital vector map is complete. If this is not the case, one has to allow that a trace point is not allocated to a line segment in any case. Algorithms which allow such unmatched points are categorized as incomplete map matching techniques.

Figure 4:
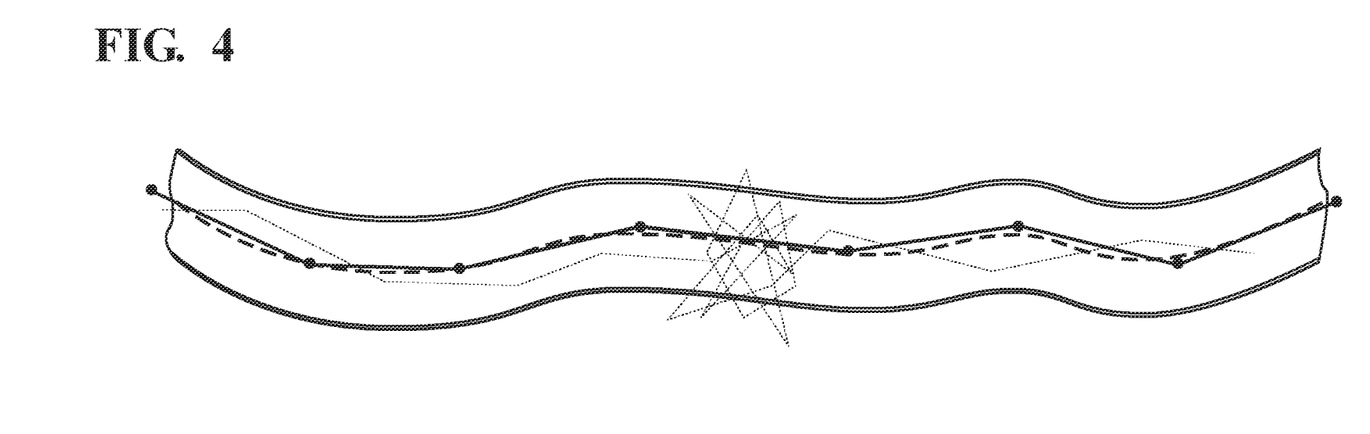
FIG. 4 is a view as in FIG. 3 showing an exemplary probe trace with insufficient quality in the form of a point cloud.
Figure 5:
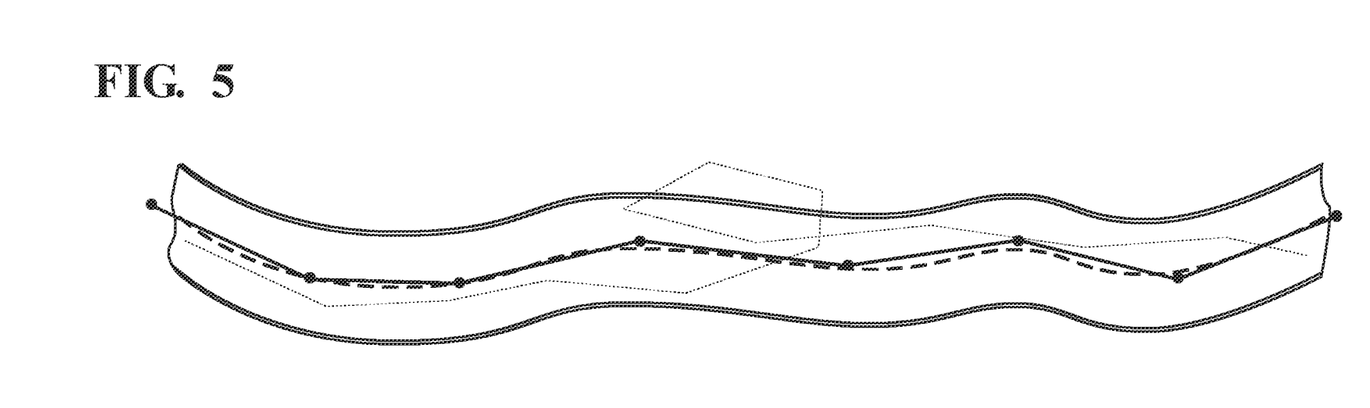
FIG. 5 is a view as in FIG. 3 showing an exemplary probe trace with insufficient quality in the form of a loop.
Figure 6:
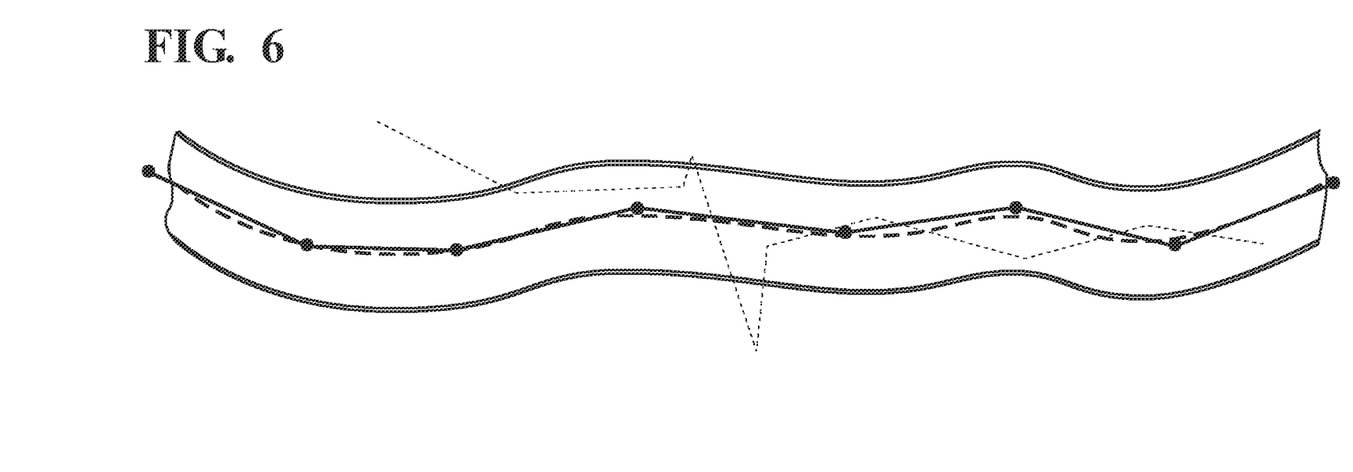
FIG. 6 is a view as in FIG. 3 showing an exemplary probe trace with insufficient quality in the form of a zig-zag.
Figure 7:
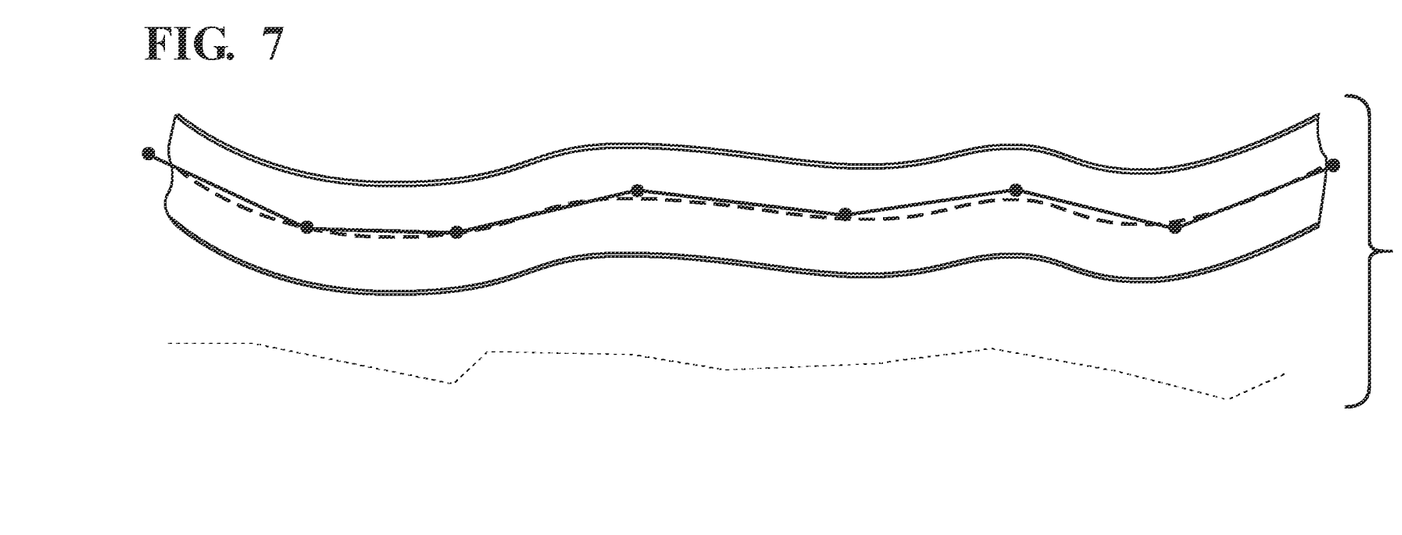
FIG. 7 is a view as in FIG. 3 showing an exemplary probe trace with insufficient quality in the form of an outlier.

For different classes of algorithms, there exists different map matching methods. For the incremental network generation, the Applicant has developed the n-points map matching technique, described more fully in PCT/EP2009/063937, filed 22 Oct. 2009. This technique, known also as the Viae Novae algorithm, works very quickly and in the most cases we get very good results. However on complex crossings or intersections with short intermediate road elements the Viae Novae algorithm is sometimes not able to deliver always the correct result. Therefore a new and improved map matching algorithm is needed. Such an improved algorithm must exhibit a high matching quality, work well with incomplete road networks (e.g., missing roads, missing or wrong topological connections, etc.), and be very robust against GPS traces with insufficient quality (i.e., bad probe data) such as traces with point clouds (FIG. 4), traces with loops (FIG. 5), traces with zig-zags (FIG. 6) and outlier traces (FIG. 7), all of which occur frequently in probe data collections. Furthermore, an improved map matching algorithm must works with uni-directional and bi-directional networks.

SUMMARY OF THE INVENTION

An improved method is provided for matching traces derived from probe data to one or more line segments in a digital map, such as a digital vector map, using traces derived from probe data. The digital map is preferably a transportation network, wherein the line segments represent at least a portion of a road, path or the like.

The method comprises the steps of: providing a digital vector map configured to store a plurality of line segments spatially associated within a coordinate system, the line segments being respectively topologically related or unrelated to one another; providing at least one probe trace having a plurality of spatially associated trace points located within the coordinate system of the digital vector map; and determining a matching candidate for each line segment within a specified distance (d) of each trace point. The method is characterized by: generating of a graph with the matching candidates as nodes (26); and selecting at least one path of matching candidates of the graph as the match result (36).

The new map matching method is very useful for the incremental map generation process, as well as for several other applications due to its inherent high matching quality. The invention generates a matching graph of the matching candidates, which in turn allows use of graph theoretic methods to find the best path through the graph. The nodes of the graph are composed of the several matching candidates. The matching graph comprises a separate level for each trace point. If a trace point has no matching candidates then the accordant level of the graph contains no nodes. A core concept of this invention is the use of a matching graph to represent all matching candidates. The graph is simplified and scored. The best paths deliver the matching results. The concepts of this invention may be used in conjunction with longitudinal distance as matching criterion.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 8:
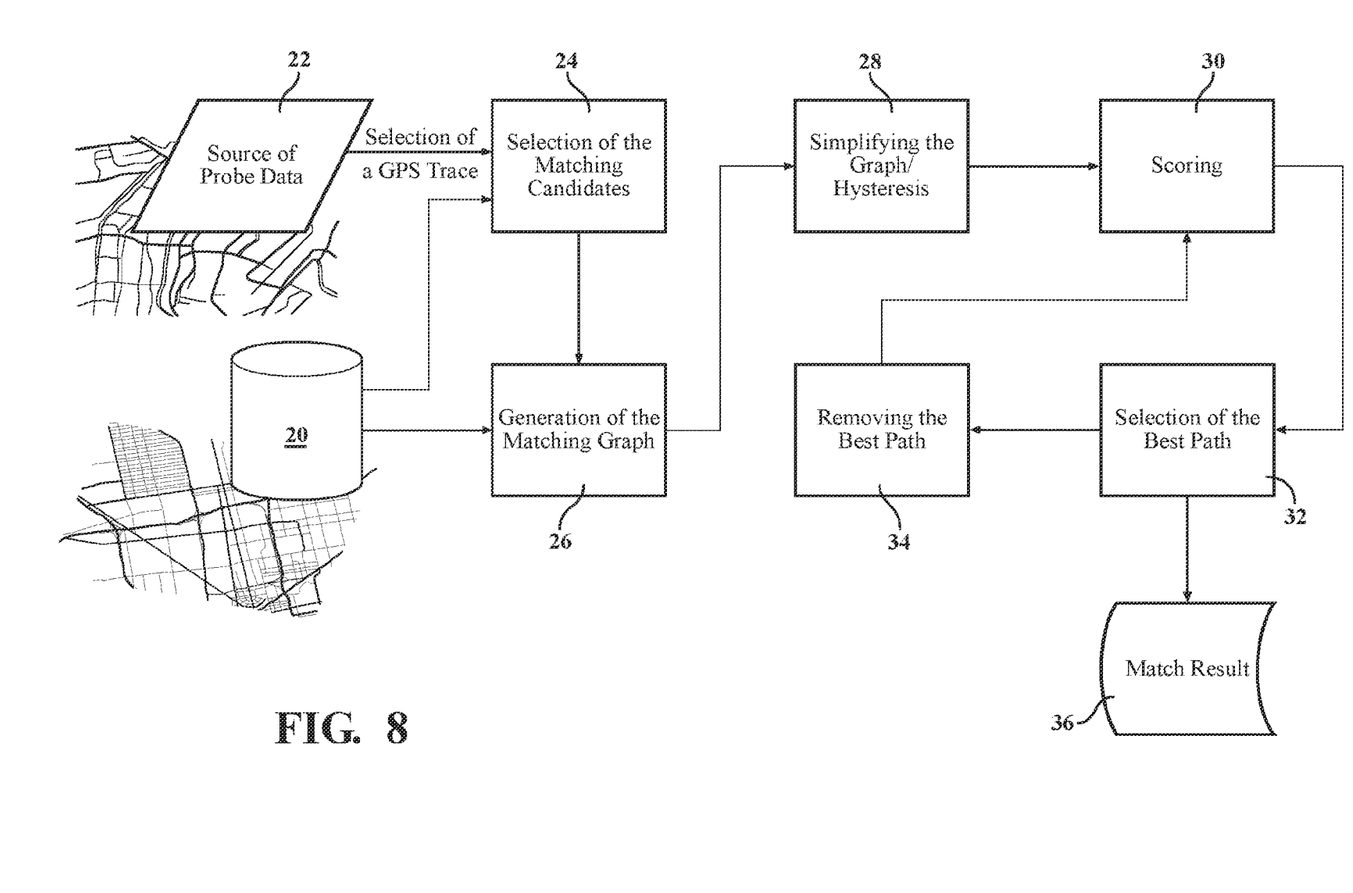
FIG. 8 a flow chart of the improved map matching method according to this invention.

Referring to the Figures, wherein like numerals indicate like or corresponding parts throughout the several views, a general overview of the map matching process according to this invention is shown in FIG. 8. A digital map 20 provides data for a road network. The digital vector map 20 is configured to store a plurality of line segments spatially associated within a coordinate system. The line segments within the digital map 20 are either respectively topologically related or topologically unrelated to one another. Each line segment contains at least one edge. When a line segment has a plurality edges, shape points interconnect the edges. Each line segment terminates at a junction.

A source of probe data 22 provides at least one, but more typically large numbers of probe traces. Each trace contains a sequence of spatially distributed trace points positioned within the coordinate system of the digital vector map. A probe trace of this type usually represents the movement of a car, bicycle, pedestrian, etc. Map matching is the process of determining upon which line segment of the digital map a traveler was traveling when the trace was created. This is accomplished by considering each point in a probe trace to identify matching candidates, and then selecting from among the candidates the best possible choices.

In step 24, the points in the probe traces are considered, one-by-one, to find one or more prospective line segments in the digital vector map to which it closely relates. A matching candidate is thus a possible match result of a given trace point to a particular line segment existing in the digital map. One trace point can have several matching candidates. One method to determine a set of matching candidates for a trace point is to select all lines of the digital vector map within a predefined maximal distance d. For each such selected line segment, one computes the projection of the trace point to the line. The set of all the projections are the matching candidates for the trace point.

The method of this invention is characterized by the step of generating a graph of the matching candidates, represented by function block 26 in FIG. 8. To facilitate an understanding of the subject algorithm, the graph may be perceived as having a plurality of sequential levels corresponding in number to the number of points in the probe trace. Therefore, if a given probe trace has ten points, then the graph will have ten levels. Each level of the graph corresponds in sequence to other levels in the graph just as each trace point corresponds in sequence with other trace points. As a result, adjacent trace points correspond to adjacent levels in the graph. Another way to understand the relationship between graph levels and trace points is that the first trace point is assigned to the first level, the second trace point to the second level . . . and the last trace point to the last level.

Each matching candidate is placed in the graph at the level corresponding with its trace point. If for example there exist three matching candidates for the first point of the trace—meaning that the first trace point is within the predefined maximal distance d to three different line segments in the digital map—then all three matching candidates are placed at level one in the graph.

From among the one or more matching candidates at each level, a match result is identified. The match result for each a trace point is a point in the digital vector map which corresponds to the trace point with the highest possibility. Each trace point has at most one match result. If the trace point is with a certain possibility outside the digital vector map. then it may be concluded that the trace point does not have a match result. A point in the digital vector map one can describe with the line to which the point belongs to and the chainage (also called measure) along this line. Alternatively one can describe a point in a digital vector map with the line and a shape point of this line.

Each match result is deemed a node in the graph. One or more paths extend through the nodes, i.e., through one matching candidate in each level. The paths are composed of sequences of nodes in which each two consecutive nodes are connected by an edge. Each path directionally connects one matching candidate in each level to a matching candidate in the next adjacent level, provided the respective two matching candidates are topologically related to one another. Said another way, each path must not purport to connect topologically unrelated line segments to one another—i.e., line segments representing roads in reality which are not able to be traversed one to another. In this manner, two nodes are connected if the following conditions hold: 1) the matching candidates belong to adjacent levels, 2) there exists a (local) route between the two projected points, and 3) no passed shape point of the route is already contained in any above paths.

For the sake of clarity, it should be understood that the paths are special partial graphs of the graph which have a linear order. As a graph is generated, it will contain one or several paths. Generally stated, a graph contains two different types of objects: nodes and edges. An edge is a (ordered) pair of nodes. The edges represent connections between nodes. The nodes of the graph are the matching candidates. Two nodes are connected by a directed edge if there exist a topological connection between both matching candidates. Thereby only local topological connections are to consider. Topological connections via a detour, for example, should not be considered. A unidirectional map matching should also consider the sense of direction of the topological connection. On the other hand, a bidirectional map matching process should not consider the sense of direction. In order to find out the local topological connection between and among the possible matching candidates (i.e., the line segments represented by each matching candidate), one can use for example a routing algorithm limited with a maximal search distance.

A graph containing at first all possible paths is then simplified by any suitable technique including for example a hysteresis approach at step 28. Another simplification technique is to remove all nodes with a longitudinal distance between the matching candidate and the corresponding trace point greater than a predefined maximal longitudinal distance. Following simplification, various paths may be scored 30 so that from among them a best path may be selected 32. The scoring is, preferably, based on the number of connected nodes in the longest path to which the node belongs and/or the mean distance. Further criteria may be used. During or after the scoring step 30, edges and/or nodes may removed if the score is lower than others. This will further simplify the graph.

Based on the scoring result it is relatively straightforward to select the best path (step 32) from the graph. In the most cases the selected path contains already one node for each level, which means that a match result 36 has been reliably found for each trace point. However in few cases it is possible that the path contains no nodes for some levels. This can be the case if there is a missing topological connection between two lines of the digital vector map. In this case (where a path is found to contain no nodes for some levels) it is preferable to remove some or all nodes which have the same levels like the nodes of the selected path, which corresponds to step 34 in the flow diagram of FIG. 8. This removal step 34 will further simplify the graph. After removal 34, the graph is re-scored 30 and the next best path selected (32). This removal 34, rescoring 30 and selecting 32 sequence is repeated until reliable match results have been found for all trace points, or until the graph is empty. Ordinarily only very few iterations are necessary.

Figure 10:
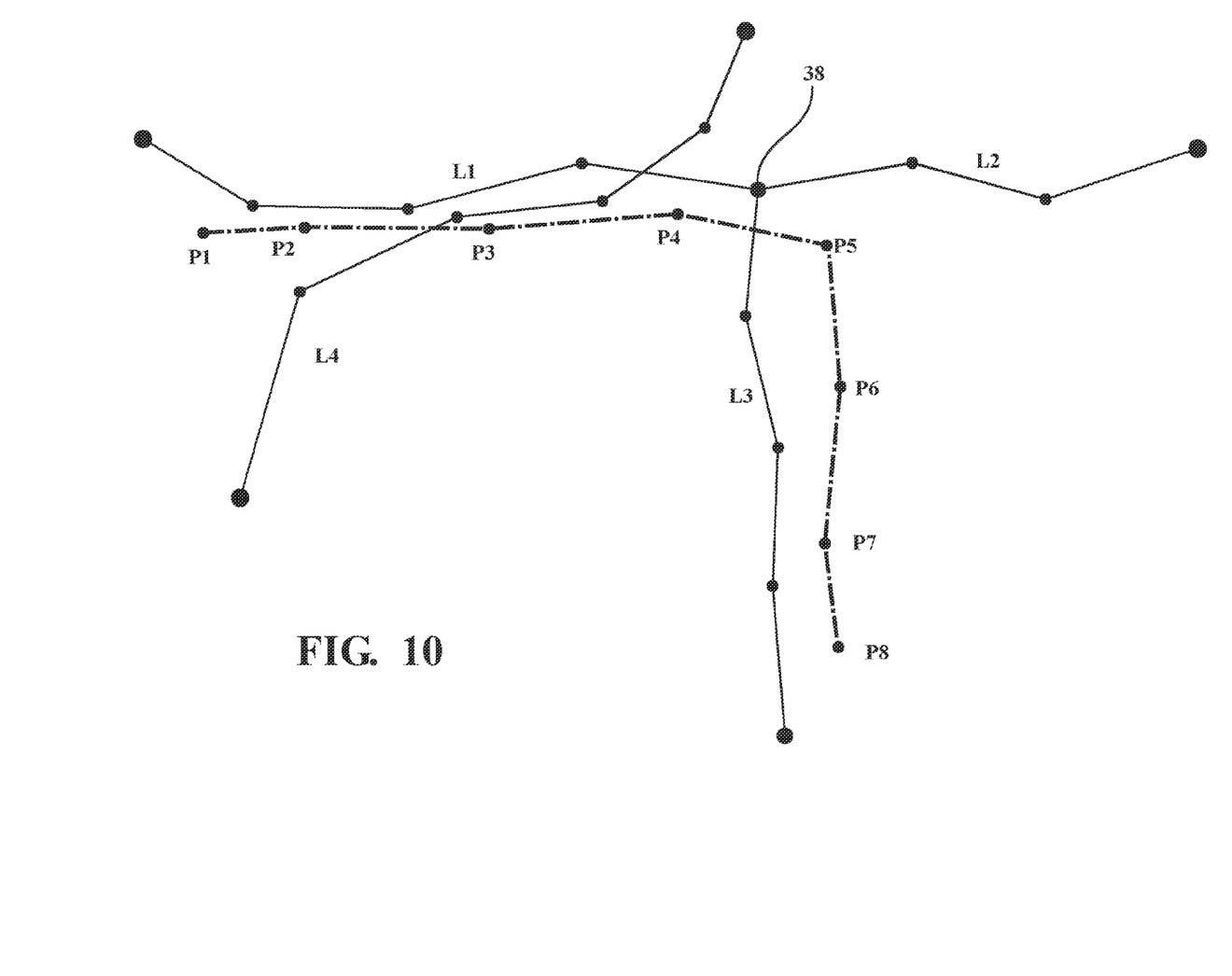
FIG. 10 is a view of the four line segments of the digital network from FIG. 9, together with an exemplary single trace line defined by trace points P1-P8.

An illustrative example is provided by way of FIGS. 9-13. Here, roads in reality are represented in a digital network by line segments L1-L4, which are presumed to have originated from a digital map 20. Line segments L1, L2 and L3 are topologically related to one another at a common intersection marked by junction 38. Line segment L4, on the other hand, is topologically unrelated to L1, L2 and L3. The road in reality corresponding to L4 passes underneath the L1 portion of roadway without permitting traffic to interact directly with any of L1, L2 or L3. FIG. 10 shows these same line segments L1-L4 together with a probe trace represented by points P1-P8. The probe trace originates from data source 22.

Figure 11:
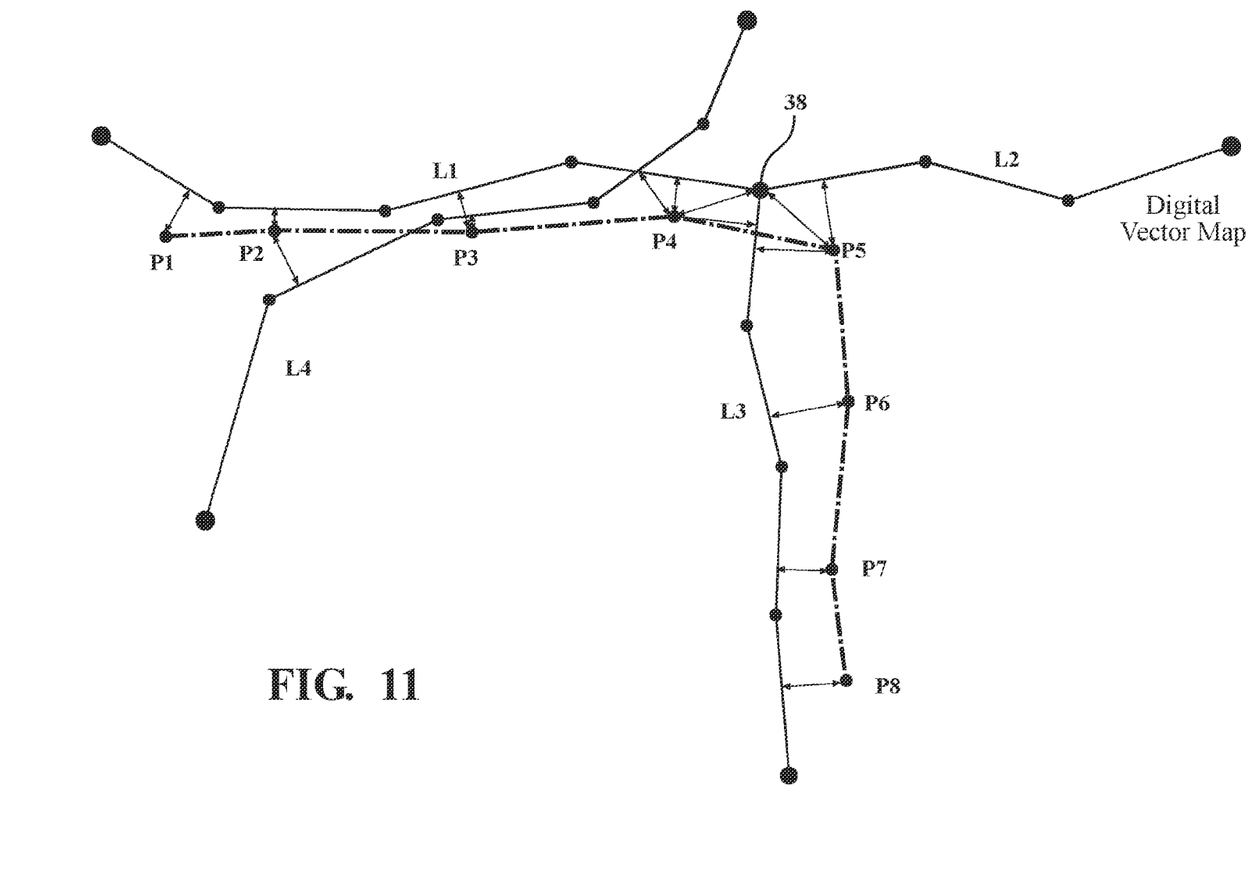
FIG. 11 is a view as in FIG. 10 showing all matching candidates for each trace node P1-P8.

The selection of matching candidates step 24 is accomplished with a suitable algorithm. For example, the algorithm may be based on the distance of each respective trace point or node (P1, P2, P3, . . . P8) to the several network elements (L1, L2, L3, L4) as compared with a predetermined threshold value d. A matching candidate of a trace point p is a network element with its closest point to p. A network element can be the orthogonal projection of p to a line segment, a junction (e.g., 38) or, a shape point. FIG. 11 shows all matching candidates of the trace (P1-P8) to a road network of composed of four line segments L1-L4.

Figure 12:
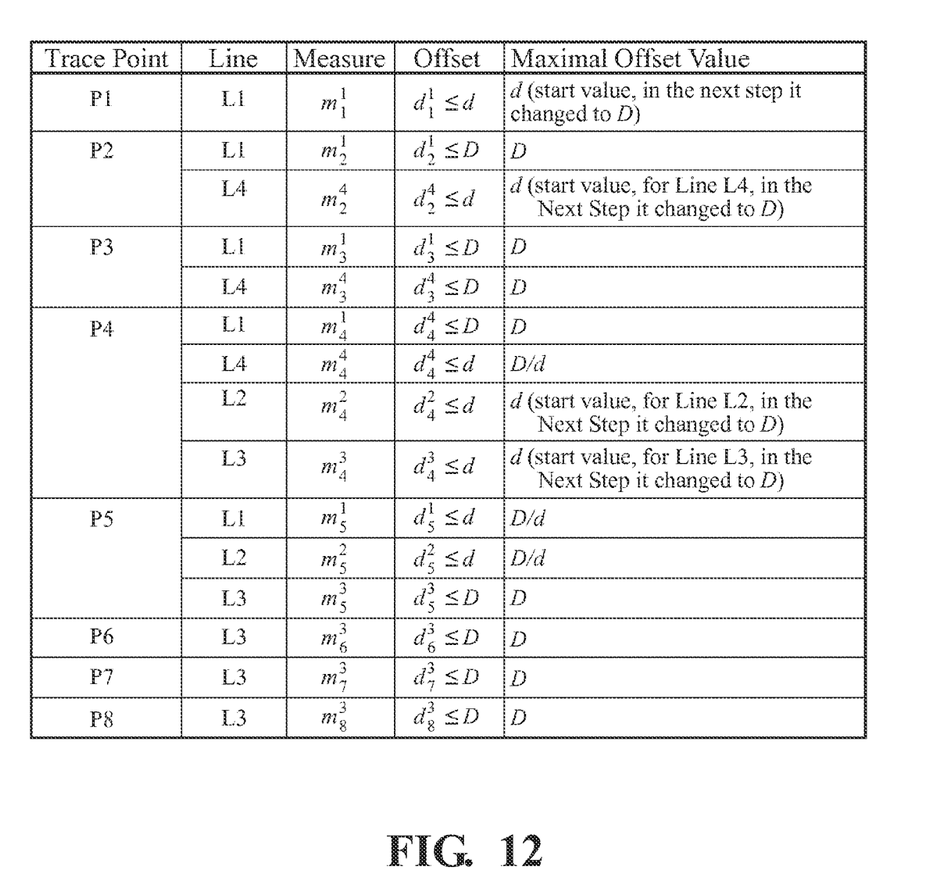
FIG. 12 is a table depicting a mapping strategy for determining matching candidates.

The graph generating step 26 is primarily an algorithm for generating a matching graph of the matching candidates, and is depicted in table form in FIG. 12. This approach allows using graph theoretic methods to find the possible paths through the graph and then select from them the best. The nodes of the graph are the several matching candidates. The matching graph comprises for each trace point (P1, P2, P3, . . . P8) a separate level. If a trace point has no matching candidate, then the accordant level of the graph contains no nodes.

Figure 13:
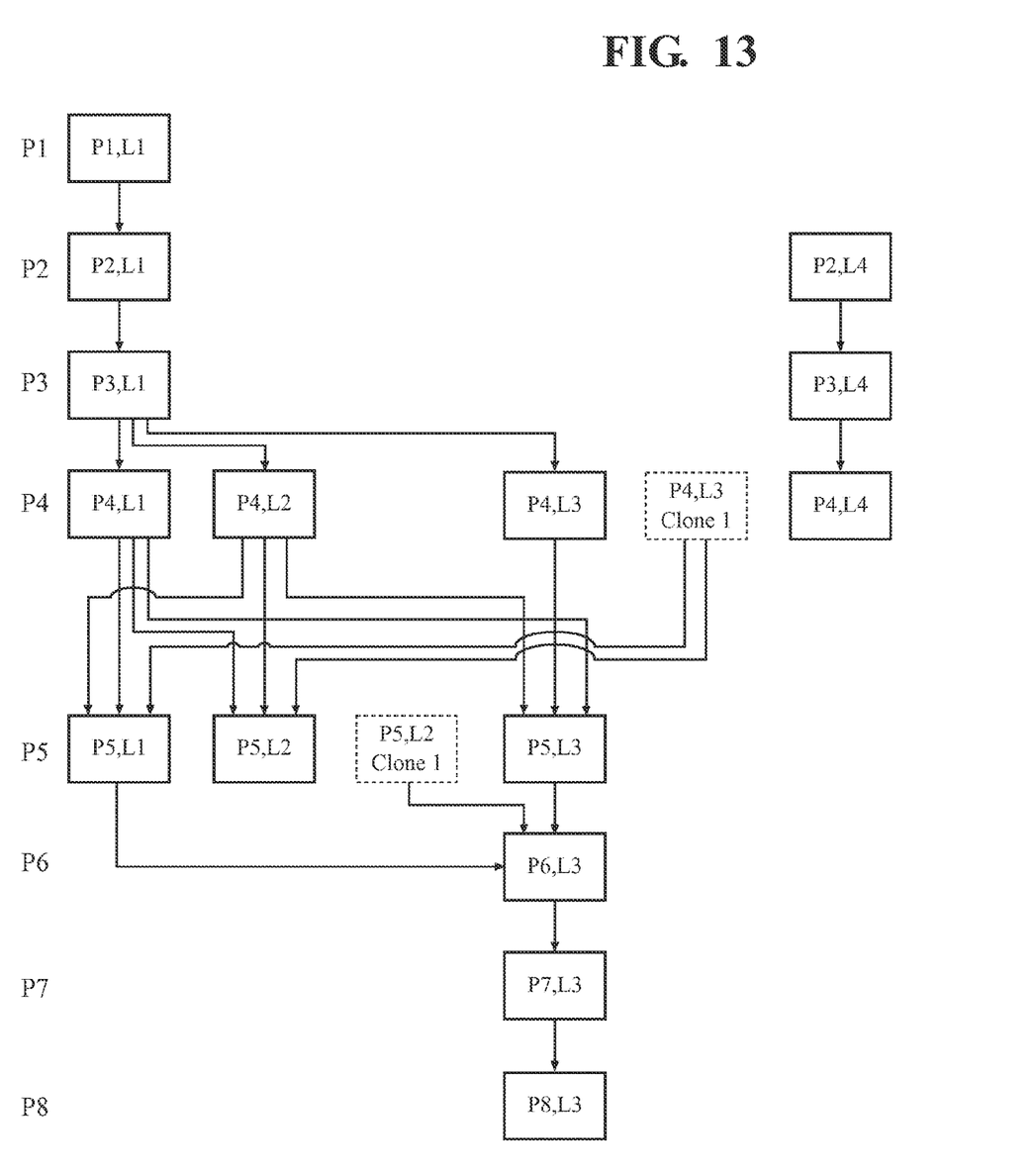
FIG. 13 is a directed graph according to the subject invention whereby each matching candidate is placed at a level in the graph and paths established between candidates in adjacent levels in accordance with predetermined criteria.

FIG. 13 shows a matching graph corresponding to the example in FIGS. 11 and 12. The matching graph is thus shown as a directed graph where only nodes of adjacent levels are connected with an edge provided the satisfy the conditions stated previously. Namely, that between two adjacent matching candidates exists only a connection if there is a route (i.e., an actual topological relationship) between both projected points. Depending if one allows a route in opposite traffic direction, a unidirectional or bidirectional map matching is possible. As a further condition, two nodes of the graph are connected if no passed shape point of the route is already contained in any above paths. This further condition should avoid that a shape point is passed several times. If a shape point of the route is already contained in a previous path one has to clone a partial graph. This is shown for example in FIG. 13 at candidate [P4,L3] and also at candidate [P5,L2]. In the simplest case we have to clone only single nodes. However if we find the passed shape points several levels before it may be necessary to clone a real sub graph.

After generating the matching graph at step 26, it is preferable to simplify the graph at step 28. If two matching candidates of the same trace point have the same projection point, then both represent the same match result. This can occur for example at junctions. In this case we can simplify the graph by removing one of the matching candidates. Sometimes a trace runs nearly parallel to a line segment.

Figure 14:
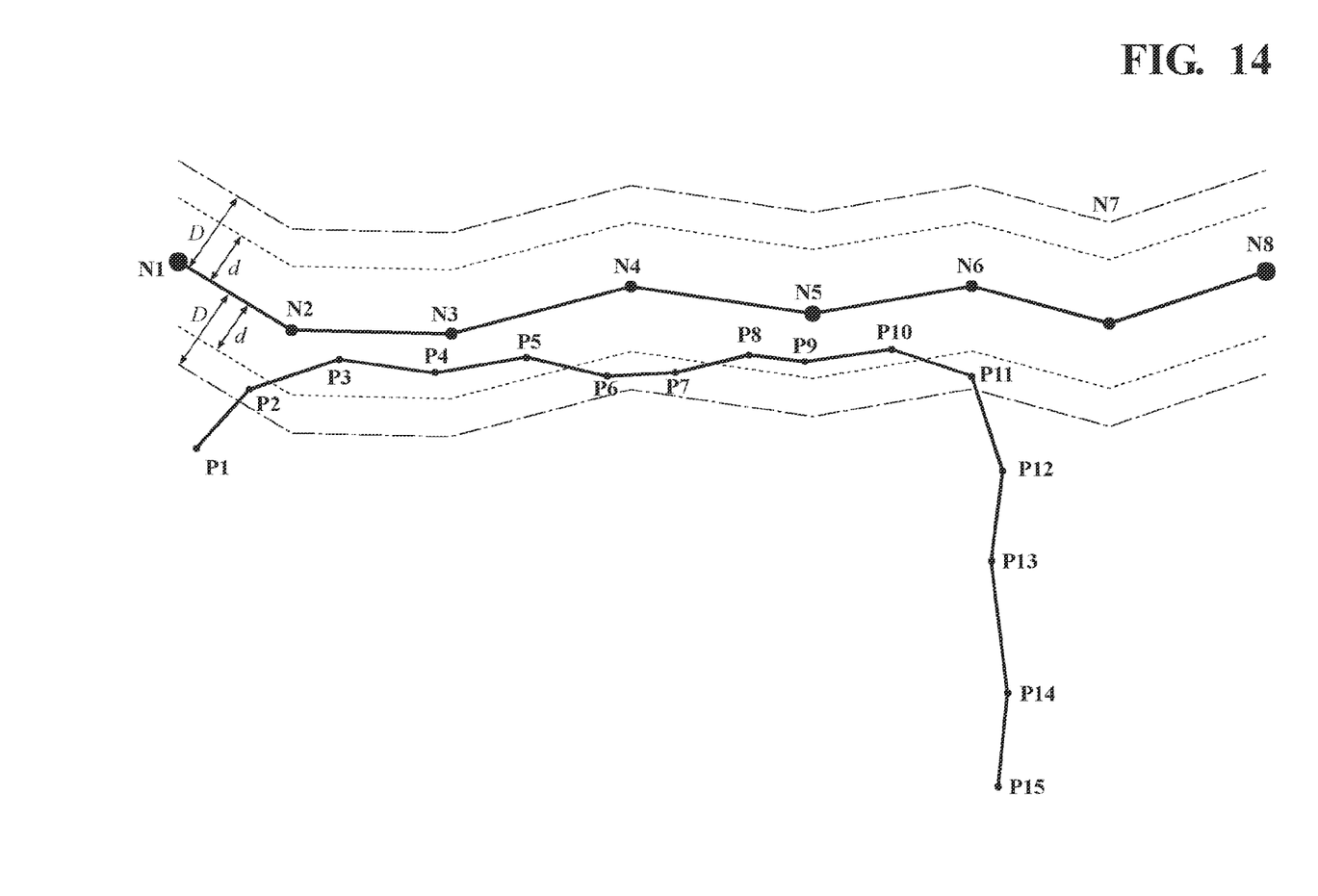
FIG. 14 is an exemplary method for matching trace points to a line segment using a hysteresis effect.

Simplification (step 28) may also include the application of a hysteresis algorithm. If the offset of some trace points is lower and of some other points greater than the maximum offset value, the match status may change often. An example of this is provided in FIG. 14 where only the trace points 3, 4, 5 and 8, 9, 10 have an offset value lower than d. If the maximum offset value is set equal d only the trace points 3, 4, 5 and 8, 9, 10 are matched to the line segment N1-N8. Without using a hysteresis approach, one would get two portions of matched trace points which are separated by the unmatched points 6 and 7. In order to avoid such frequent changes of the match status, one may use two different maximal offset values, a lower value d and a greater value D. In general the greater value D is used. However at the beginning and the end of a path in the matching graph, one may prefer to use the smaller value d.

In order to use the hysteresis for the graph-based map matching of this invention, the greater distance limit D can be used to establish the matching candidates as described above. In the simplification step a node may be removed if the distance between the trace point and the matching candidate is greater than the lower distance limit d. However whether the node is to remove depends from the position of the node in the graph. Such a position depending criterion could perhaps be the number of predecessors or successors of the node.

The subject invention proposes several possibilities to simplify a graph as described above. These simplification steps (28) may include, but are not limited to, implementing a kind of hysteresis effect as stated above. Another is to use the heading to the next trace point and from respectively previous trace point as stated above. Of course it is possible to use both improvements together, for example by establishing a large ($\Phi$) and a small ($\varphi$) angle limit. Depending on the position of a node in the graph, the larger or smaller angle limit will be used. Then a node is removed if the angle between the headings of the trace point and the line at the matching candidate is larger than the angle limit.

Similarly, one may use other criteria like the longitudinal distance. Depending on the position of a node in the graph, one may use a larger or smaller limit of the longitudinal distance. In this approach, a node is removed if the longitudinal distance between the trace point and the matching candidate is larger than the chosen limit.

Returning again to the example of FIGS. 9-13, when establishing paths, it is preferable to start at nodes in the graph which have no predecessor. Such nodes may be referred to as start nodes which, in this example, would correspond with the level for trace point P1. Then all start nodes are removed having a distance greater than the threshold distance d. The process of removing nodes is stopped when a node is reached with a distance smaller than d.

The same is done with all nodes which do not have any successor. Such nodes may be called end nodes which, in this example, would correspond with the level for trace point P8. However the hysteresis effect is typically not used if the candidate appears on the first or last level of the graph. In this latter case, it is not known if the trace actually ends here. Beside the hysteresis effect, it is also possible to use additional criteria like the longitudinal distance. Of course for these additional criteria one can also use the hysteresis.

It is generally undesirable to use any heading or angle criterion, particularly in cases where the heading data is computed from the trace positions, i.e., trace points. The reason is that the probe data usually contains bad traces exhibiting zigzag lines (FIG. 6) or loops (FIG. 5), etc. If trace points are close together, the heading is instable. However, when independent heading information is provided with high quality, it is generally desirable to use a heading criterion in the same manner like the longitudinal distance.

The next step 30 is scoring the matching graph. Two criteria may be used for the scoring: 1) Number of match results in a path, and 2) The mean distance. The main criterion is the length of the path. The longer the path the better should the match result. The distance criterion is used primarily if two nodes have nearly the same score. In order to compute the mean distance, various techniques may be used, such as: an arithmetic mean, the squared mean or any other mean function. The Scoring step 30 starts at each start node and runs, preferably, from top to bottom. If a top-to-bottom branch exists in the graph, then the scoring follows both branches. If a node is already scored, one may compare the score and remove the connection with the smaller score. So after scoring 30, the matching graph contains no branches from bottom up. However from top to bottom the graph may still contains branches. After Scoring 30, the best score belongs to an end node.

In order to get the best path 32, we have only to find the end node with the best score. Because the matching graph contains no branches from bottom to top after Scoring 30, we can collect the best path bottom-up. The best path 32 thus represents the first matching result. However it is possible that the first points or the last points are not the best match results. Therefore one may wish to set a certain number of the first and last match candidates of the path to the vacancy status. All other match candidates of the path get the reliable status.

In the next step 34, the path is removed from the matching graph. Also one may remove all nodes from the graph with the same level like a reliable match candidate. After step 34, the remaining matching graph is re-scored at step 30. Then one may select the next best path in step 32. Once again, the reliable and vacancy status are set to the path nodes. If the vacancy ranges overlap each other, then the local best nodes are selected and set to the reliable status. The nodes with the worse score are removed. The path selection is thus repeated so long there is a further path which fulfils a least matching condition. From this iterative process, the one most reliable node at each level is selected with a reliable or vacancy status. These then represent the final matching results in Step 36. As a consequence of these steps, the final matching path is resolved as [P1,L1]>[P2,L1]>[P3,L1]>[P4,L1]>[P5,L3]> [P6,L3]>[P7,L3]>[P8,L3].

Using the principles of this invention, quality measures can derived from the scoring criteria used in the path selection process. These may include topological quality measures and/or geometrical quality measures. More specifically, topological quality measures may include the number of match results in a path. Geometrical quality measures may include the mean distance (arithmetic mean, squared mean or any other mean). The difference to the next best alternative match result may comprise the difference in the number of match results in the paths (for topological quality measures) and the difference in the mean distance (for geometrical quality measures).

Simply stated, this invention relates to an improved map matching method for matching probe traces to existing road elements, and which can be used in an incremental map generation process, such as (but not limited to) the Viae Novae algorithm. The map matching method of this invention selects one of the matching candidates in each level of the graph as a match result for a given trace point, or alternatively marks the trace point as unmatched. The map matching method can be used for example as a replacement for the method described in PCT/EP2009/063937, filed 22 Oct. 2009. The map matching algorithm contains the following steps: i) determine those road elements that each point of a probe trace may match based on a distance criteria (i.e. if the shortest distance between a trace point and a road element is less than a predetermined threshold); ii) the "all possible matching candidates" are then turned into a graph, wherein the nodes describe a matching candidate to a particular road element and the edges indicate the process of a topological connection in the digital map between neighbouring road elements ("clone" nodes in the graph are used on the assumption that no U-turns are made in the probe trace, e.g. at the junction between L1, L2 and L3, the probe is unlikely to go from [P3, L1]>[P4, L3]>[P5, L1]); iii) the graph is then simplified, e.g. by using the hysteresis effect, longitudinal distance and/or other suitable technique (it is noteworthy that heading and angle criteria are not required); iv) the graph is then scored from top to bottom based on the number of match results in a path (and mean distance in the case of a deadlock between paths); v) the best path is then identified working from bottom to top and is removed from the graph; and vi) the scoring and best path selected is repeated as necessary until a match result is obtained.

There are many applications for this invention in the field of digital maps. These applications may include, for example, analysis of probe data, incremental network generation processes (e.g., the Viae Novae project), feature extraction from probe data (e.g., speed profiles, traffic density, road classifications, etc.), data quality checks (e.g., completeness and correctness of a road network, plausibility checks for road attributes, etc.), and network conflation tools, to name but a few.

Elements and/or features of different example embodiments can be combined with each other and/or substituted for each other within the scope of the disclosure and appended claims.

Still further, any one of the above-described and other example features can be embodied in the form of an apparatus, method, system, computer program and computer program product. For example, any of the aforementioned methods may be embodied in the form of a system or device, including, but not limited to, any of the structure for performing the methodology illustrated in the drawings.

Whilst embodiments described in the foregoing detailed description refer to GPS, it should be noted that the navigation apparatus may utilise any kind of position sensing technology as an alternative to (or indeed in addition to) GPS. For example, the navigation apparatus may use other global navigation satellite based such as the European Galileo system. Equally, it is not limited to satellite based, but could readily function using ground based beacons or any other kind of system that enables the device to determine its geographic location.

The foregoing description of the invention is exemplary rather than limiting in nature. Variations and modifications to the disclosed embodiment may become apparent to those skilled in the art and fall within the scope of the invention. Accordingly, the scope of protection afforded to this invention is defined only by the following claims.

The invention claimed is:

1. A method for matching traces derived from probe data to one or more line segments in a digital map, said digital map configured to store a plurality of line segments spatially associated within a coordinate system, the method comprising:
    providing at least one probe trace having a plurality of spatially associated trace points located within the coordinate system of the digital map;
    determining, by a processor, a matching candidate for each line segment within a specified distance of each trace point;
    generating, by the processor, a graph data structure, the generating comprising:
        creating nodes for the graph, the nodes including a separate node for each matching candidate for each line segment within a specified distance of each trace point;
        organizing the nodes into a plurality of levels in the graph, each level in the graph being associated with a different trace point from among the trace points, adjacent levels in the graph being associated with trace points that are adjacent to one another in the trace, and each level in the graph including only the nodes for the respective trace point; and
        connecting edges between nodes in adjacent levels in the graph, the connecting comprising connecting an edge between a node for each matching candidate and nodes for one or more matching candidates in adjacent levels in the graph when one or more conditions for traveling between the respective line segments are met;
    selecting, by the processor, at least one path of matching candidates of the graph as a match result; and
    generating, by the processor, a digital map based on the match result.

2. The method of claim 1, wherein the one or more conditions for traveling between the respective line segments include a condition that a local topological connection exists between the line segments in the digital map.

3. The method of claim 1, further comprising scoring the graph.

4. The method of claim 3, wherein said scoring includes establishing scoring criteria based on at least one of the number of connected matching candidates in a path and the mean distance.

5. The method of claim 3, wherein the graph has a top and a bottom, and wherein said scoring includes scoring the graph from the top to the bottom.

6. The method of claim 3, wherein said scoring includes removing connections with a smaller score to simplify the graph.

7. The method of claim 1, wherein the graph includes a plurality of paths, each path having respective end nodes, said selection of at least one path including selecting the path with the best end node score.

8. The method claim 1, further comprising simplifying the graph.

9. The method of claim 8, wherein said simplifying includes removing at least one node having the same level like any node of a previously selected path from the graph.

10. The method of claim 8, wherein said simplifying includes removing nodes with a distance between the matching candidate and the corresponding trace point greater than a predefined maximal distance.

11. The method of claim 8, wherein said simplifying includes removing a node if an angle between the headings of the trace point and the line at the matching candidate is larger than a predefined angle limit.

12. The method of claim 8, wherein said simplifying includes applying a hysteresis algorithm.

13. The method of claim 8, further comprising re-scoring the path following said simplification.

14. The method of claim 1, further comprising cloning a partial graph.

15. A non-transitory computer-readable medium which stores a set of instructions which when executed performs a method for matching traces derived from probe data to one or more line segments in a digital map, said digital map configured to store a plurality of line segments spatially associated within a coordinate system, the method executed by the set of instructions comprising:

provinding at least one probe trace having a plurality of spatially associated trace points located within the coordinate system of the digital map;

determining a matching candidate for each line segment within a specified distance of each trace point;

generating, by the processor, a graph data structure, the generating comprising:

creating nodes for the graph, the nodes including a separate node for each matching candidate for each line segment within a specified distance of each trace point;

organizing the nodes into a plurality of levels in the graph, each level in the graph being associated with a different trace point from among the trace points, adjacent levels in the graph being associated with trace points that are adjacent to one another in the trace, and each level in the graph including only the nodes for the respective trace point; and connecting edges between nodes in adjacent levels in the graph, the connecting comprising connecting an edge between a node for each matching candidate and nodes for one or more matching candidates in adjacent levels in the graph when one or more conditions for traveling between the respective line segments are met;

selecting at least one path of matching candidates of the graph as a match result; and generating a digital map based on the match result.

16. The non-transitory computer-readable medium of claim 15, wherein the one or more conditions for traveling between the respective line segments include a condition that a local topological connection exists between the line segments in the digital map.

17. The non-transitory computer-readable of claim 15, wherein the graph includes a plurality of paths, each path having respective end nodes, said selection of step of selecting at least one path including selecting the path with the best end node score.

18. The non-transitory computer-readable of claim 15 further comprising cloning a partial graph.

19. The method of claim 1 further comprising storing the generated digital map or providing the generated digital map to a device to perform navigation functions.

20. The non-transitory computer-readable of claim 15 further comprising storing the generated digital map or providing the generated digital map to a device to perform navigation functions.

* * * * *